Aug. 7, 1951     J. V. BROSAMER     2,563,514
BALE ELEVATOR
Filed Dec. 2, 1948     4 Sheets-Sheet 1
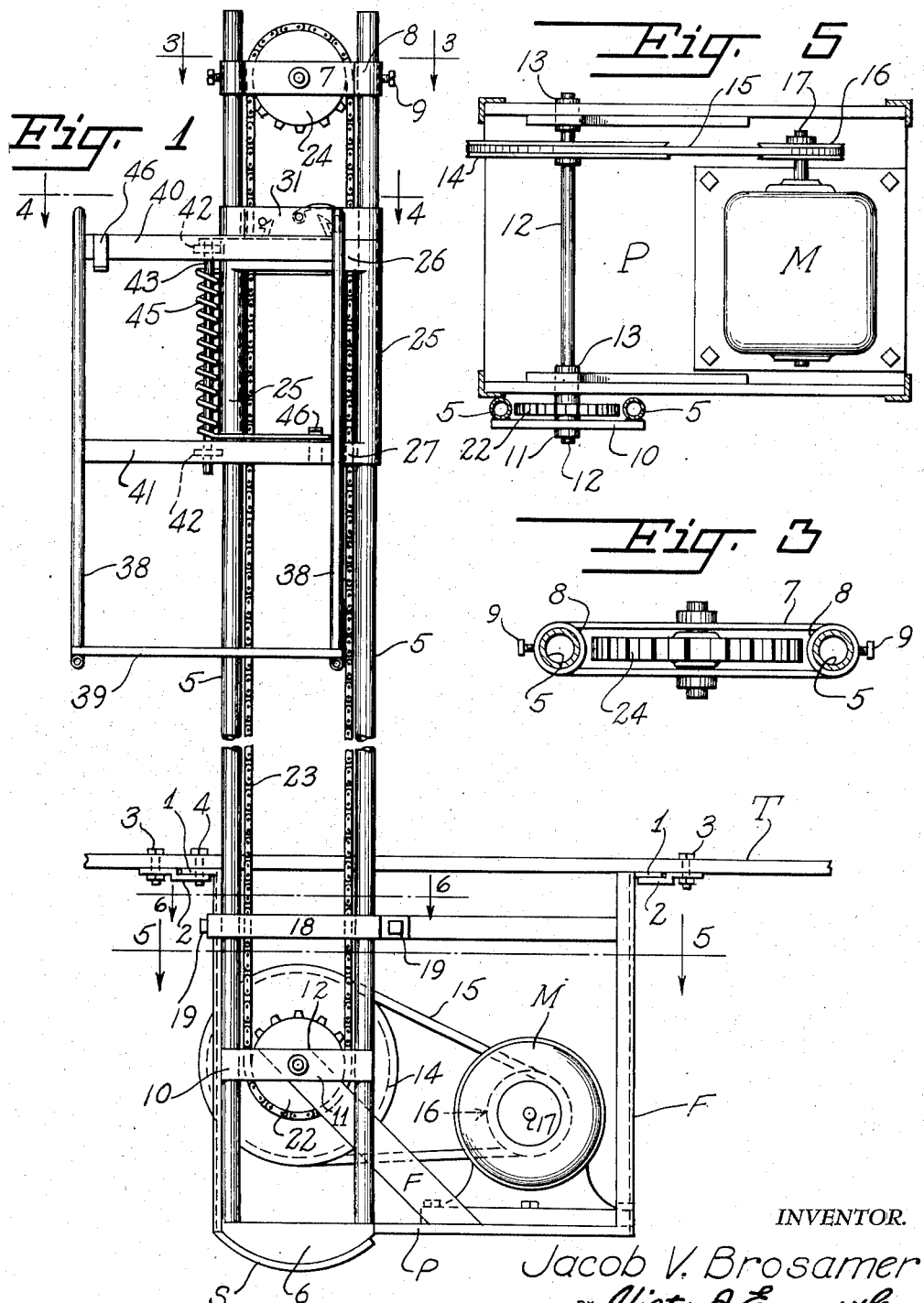
INVENTOR.
Jacob V. Brosamer
BY *Victor J. Evans & Co.*
ATTORNEYS Aug. 7, 1951  J. V. BROSAMER  2,563,514
BALE ELEVATOR
Filed Dec. 2, 1948  4 Sheets-Sheet 2
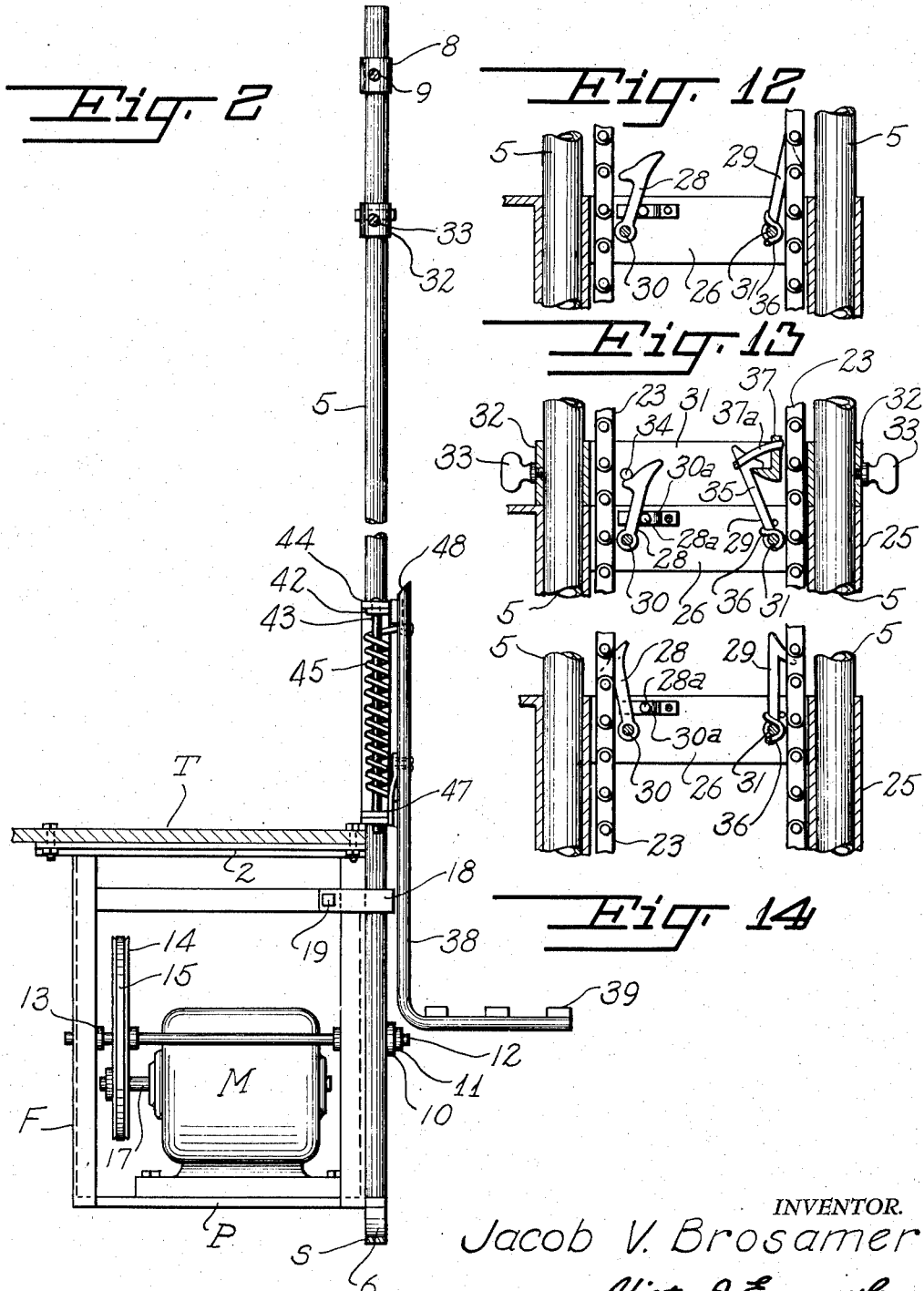
INVENTOR.
Jacob V. Brosamer
BY Victor J. Evans & Co.
ATTORNEYS Aug. 7, 1951 J. V. BROSAMER 2,563,514
BALE ELEVATOR
Filed Dec. 2, 1948 4 Sheets-Sheet 3
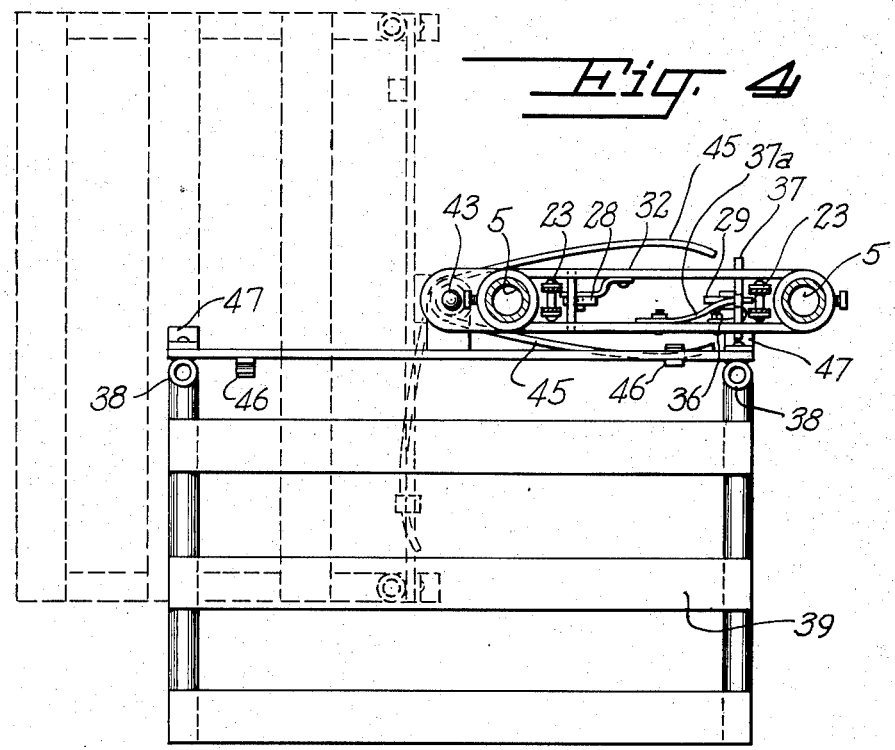
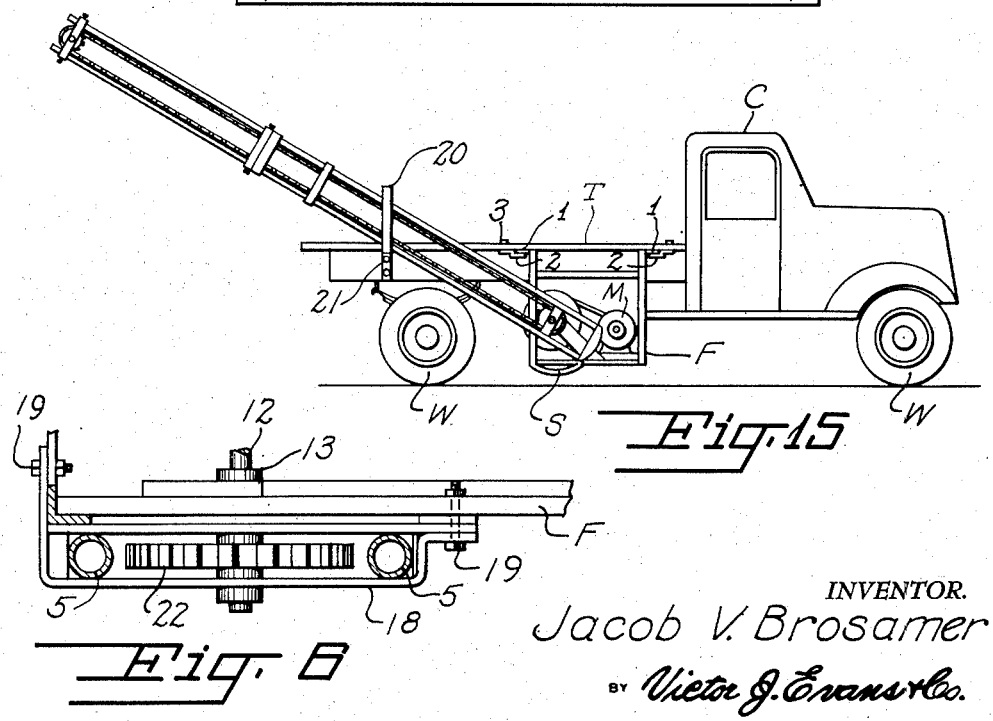
INVENTOR.
Jacob V. Brosamer
ATTORNEYS Aug. 7, 1951  J. V. BROSAMER  2,563,514
BALE ELEVATOR
Filed Dec. 2, 1948  4 Sheets-Sheet 4
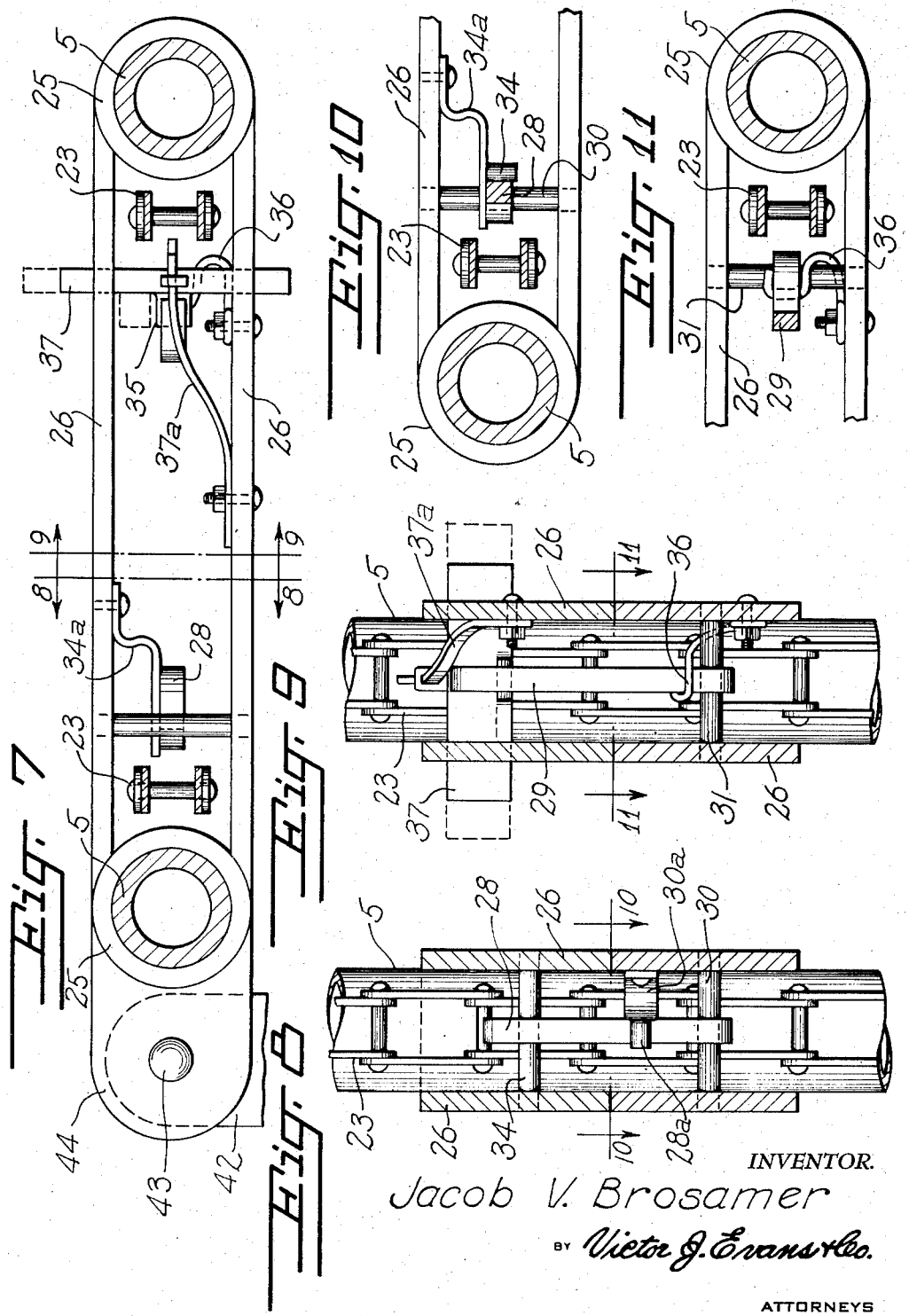
INVENTOR.
Jacob V. Brosamer
BY Victor J. Evans & Co.
ATTORNEYS Patented Aug. 7, 1951

2,563,514

UNITED STATES PATENT OFFICE 2,563,514

BALE ELEVATOR

Jacob V. Brosamer, Lincoln, Ill.

Application December 2, 1948, Serial No. 63,113

7 Claims. (Cl. 214—95)

The present invention relates to the general class of material and article handling of the loading and unloading vehicle type, and more specifically to an improved elevator for bales of hay and the like which while adapted for stationary use, is especially designed as an attachment for use on automotive trucks, trailers, and similar vehicles, and means are provided whereby the attachment may be interchangeably employed with various trucks or vehicles equipped for this purpose.

In carrying out my invention I utilize a unitary attachment, including a carrier and an operating motor for the elevator, by means of which a load on the carrier may be swung horizontally on a vertical axis, as well as raised and lowered. Means are also provided for holding the appliance in upright position for use, and for folding the appliance to inoperative position, for transportation and other purposes.

The bale elevator includes a minimum number of parts that may be manufactured with facility and low cost of production, and the parts may be assembled with convenience to provide a unitary structure that is manually controlled, which is comparatively light in weight to facilitate mounting upon and dismounting from the carrying vehicle, and which may be utilized in handling various materials such as bales of hay, blocks of ice, and other commodities.

The invention consists in certain novel features of construction and combinations and arrangements of parts as will hereinafter be more fully described and particularly set forth in the appended claims.

In the accompanying drawings I have illustrated a complete working example of an embodiment of my invention wherein the parts are combined and arranged in accord with one mode I have devised for the practical application of the principles of my invention. It will, however, be understood that any changes and alterations are contemplated and may be made in these exemplifying drawings and mechanical structures, within the scope of my claims, without departing from the principles of the invention.

Figure 1 is a view in elevation, partly broken away for convenience of illustration, showing one physical embodiment of my invention, with the elevator in uplifted position;

Figure 2 is a view in side elevation of the appliance;

Figure 3 is a transverse sectional plan taken on line 3—3 of Figure 1;

Figure 4 is an enlarged plan view and horizontal sectional view at line 4—4 of Figure 1, showing the carrier on the front of the elevator in full lines and at one end of the elevator in dotted lines;

Figure 5 is a horizontal sectional plan at line 5—5 of Figure 1;

Figure 6 is a detail showing a sectional plan view, at line 6—6 of Figure 1, showing the lower elevator sprocket mounting;

Figure 7 is a transverse sectional view, on an enlarged scale, showing the tripping mechanism for the carrier on the chain;

Figure 8 is a vertical sectional detail showing the tripping mechanism in released position;

Figure 9 is a similar view with hoisting mechanism in lifting or elevating position;

Figure 10 is a detail with parts broken away showing a sectional plan on line 10—10 of Figure 8 illustrating the pawl on the elevator carriage which engages the chain;

Figure 11 is a similar detail also with parts broken away taken on line 11—11 of Figure 9 showing the pawl on the opposite side of the carriage which engages the chain for holding the elevator while a bale of hay is unloaded from the carrier and also for holding the elevator to the chain for lowering the carrier;

Figure 12 is a detail showing a vertical section through the elevator and carriage illustrating the positions of the pawls with the carriage being lowered;

Figure 13 is a similar section showing the position of the pawls as the elevator carriage is traveling upward;

Figure 14 is a view similar to that shown in Figures 12 and 13 with the carrier pawl in the operative position; and, Figure 15 is a view in side elevation of an automotive truck, equipped with the hoisting appliance of my invention which is shown in downwardly folded position for transportation purposes.

In order that the general arrangement and utility of parts may readily be understood I have shown in Figure 15 a typical automotive truck indicated as T, which is provided with the usual driver's cab C and four wheels W. For attachment to the truck, or to a similar vehicle, the elevating mechanism is provided with a rectangular-shape main frame F having a horizontal platform or deck P upon which a motor M is mounted for operating the elevator.

For mounting the hoisting mechanism or elevator on, and for dismounting it from the truck T, the frame F of the appliance is provided with a pair of spaced horizontal slide bars or tongues 1, 1, that project laterally from the top portion of the frame, and these tongues are slidably mounted in grooves formed by flanged rails 2, 2 located at the underside of the deck of the truck, and fastened thereto by bolts 3, 3. The appliance may be mounted at either side of the truck, and held in operative position by means of coupling bolts, as 4 that are passed through registering holes in the slide tongues and the guide rails.

A number of trucks may be equipped with standardized guide rails 2, 2, and the appliance may selectively be mounted on and dismounted from the trucks thus equipped.

As a supporting frame for the elevating or hoisting mechanism I provide an elevator that includes a pair of spaced upright tubular posts 5, 5 that are rigidly united at their lower ends by a base bar 6, and the upper ends of the posts are rigidly united by a cross head 7 that includes end collars 8 adjustable on the posts, and set bolts 9 are threaded through the collars for engagement with the posts for holding the cross head in adjusted positions.

Near its lower end the elevator is equipped with a horizontal bearing bar or plate 10 having a hub 11 in which the end of the horizontally positioned operating shaft 12 of the elevator, is rotatably mounted and this shaft is journaled in bearings as 13 of the frame F. A drive belt for the operating shaft includes a driven pulley 14 on shaft 12, a driving belt 15, a driving pulley 16, and the shaft 17 of the motor M.

With the operating shaft as a central axis, the elevator may be swung downwardly toward the rear of the truck, as indicated in Figure 15, to inoperative position, as for transportation purposes, and moved upwardly to upright position for use. The elevator is rigidly fastened to the main frame F of the appliance by means of a plate or strap 18 that partially surrounds the elevator and clamps it to the frame. Detachable bolts, as 19, are passed through holes in the two angular ends of the fastening plate, and these bolts are secured by lock nuts in usual manner.

To permit swinging of the elevator to inoperative position the bolts 19 and plate 18 are removed, then the elevator may be swung on its axis for engagement with a fastening bracket or frame 20 bolted as at 21 in upright position along the edge or side of the deck of the truck T.

The base bar 6 connecting the lower end of the post 5 of the elevator is provided with an arcuate lower surface described on a radius from the axis of the shaft 12 and the lower end of the frame F is provided with an arcuate shoe S which coacts with the lower surface of the base bar to provide a guide and supporting means therefor.

For raising and lowering the elevator carriage or load carrier I have illustrated an endless sprocket-chain hoist operated by the driving sprocket wheel 22 on the operating shaft 12, and an endless chain 23 passes around the lower drive sprocket and also around an upper driven sprocket 24 journaled in the cross head 7 of the elevator.

The flights of the endless chain pass through a vertically reciprocable carriage in the form of a rectangular slide frame that includes a pair of spaced sleeves 25, 25, slidable on the posts 5, 5 and these sleeves are rigidly united by upper and lower cross bars 26 and 27, respectively, each made up of spaced parallel plates that permit movement of the enclosed endless chain.

Within the upper cross bar 26, a lifting pawl 28 is pivoted at 30 for coaction with the upwardly moving flight of the chain, and for coaction with the other flight of the chain a suspending hook 29 is pivoted or hinged at 31 within the upper cross bar.

With the motor operating, the endless chain moves clockwise, with the pawl 28 engaged with the chain as indicated in Figure 14, and with the suspending hook 29 idling. At the end of its upward movement the carriage is stopped, as the lifting pawl 28 is disengaged from the chain and the suspending hook 29 remains inoperative, being separated from the endless chain, and the motor M is cut out, the carriage being suspended for loading and unloading purposes as hereinafter described. After the load is disposed of from the elevator, the suspending hook 29 is released and the carriage under suitable control means is permitted to descend to lowered position, traveling with the opposite downwardly moving flight of the chain.

For stopping the upward movement of the carriage an adjustable stop bar 31, similar to the bar 26 of the carriage, is provided with collars 32, and set bolts 33 for engagement with the posts of the elevator to hold the stop in adjusted positions. As best seen in Figure 13, the stop bar is equipped with a cross pin 34, located in the path of movement of the lifting pawl 28, and upon contacting this release or cross pin, the lifting pawl is moved inwardly and disengaged from the ascending flight of the chain. The pawl 28 is urged into holding engagement with the chain by a pin 28a on the spring 30a.

Within the stop bar, and spaced from the pin 34, a supporting lug or bridge-piece 35 is carried on a laterally slidable bar 37 and mounted in the path of the suspending hook 29 as it idly ascends with the carriage, and upon contact with this supporting lug and with a cam action the suspending hook is slipped into engagement with the supporting lug 35, to support the carriage in uplifted position. The bar 37 and lug 35 are maintained in the position of holding the hook 29 by a spring 37a, as shown in Figure 7.

For lowering the carriage the lifting hook 29 is disengaged by lateral movement of the bar 37, from the lug 35, and automatically engaged with the descending flight of the chain to support the carriage and its load; and by means of a leaf spring 36, the suspending hook is resiliently held in the chain, the hook being released from the supporting lug 35 by one of the vertical posts 38 of the carrier platform 39 as the carrier arrives at the position shown in Figure 4. The carrier may be rotated through an angle of 180° wherein the other post 38 of the carrier will engage the opposite end of the bar 37 so that the lug 35 will be moved across the carriage to release the hook 29. The hook 29 is, therefore, released from the lugs 35 by swinging the carrier to a position in the same plane as that of the elevator and on either side thereof and as the hook 29 is released, the spring 36 will urge the hook into the chain, as shown in Figures 12 and 14, and the descending flight of the endless chain which passes freely by the suspending lug 35, carries the carrier and carriage down the elevator.

The load carrier is suspended on the carriage for raising or lifting a load, as a bale of hay, and for lowering a similar load, and for loading and unloading purposes this elevator may be swung in a horizontal plane upon a vertical axis mounted upon one end of the carriage.

The carrier comprises two tubes spaced apart and each tube includes an upright post 38 and a horizontal arm with the two arms united by cross slats 39 to form an L-shaped structure. The two upright posts 38 are united by two vertically spaced horizontal brace bars 40 and 41 each provided with a hinge ear as 42, and a long vertical hinge bolt 43 is passed through these ears and complementary perforated hinge ears 44 of the carriage. To resiliently hold the carrier in desired positions, a spring 45 is coiled about the hinge bolt 43 between the two hinges, with the ends of the spring positioned to be held in clips 46 on the carrier, and after the carrier is loaded it may manually be pushed to unloading position from which it will be retracted by the spring.

As best seen in Figure 2, the carrier is provided with two vertically positioned leaf springs 47 that engage the elevator posts 5 to prevent the carrier from jamming with the carriage as it reaches the stop bar and its trip mechanism, and the upper ends of the posts of the carrier are preferably beveled as at 48, to prevent accidental or excessive upward movement of the carriage and carrier in coaction with the trip mechanism.

The loading and unloading mechanism may be manually and automatically controlled for various operations, as for instance, with the carrier lowered to loading position of Figure 2, after a bale has been deposited thereon, the lifting pawl is manually engaged with the ascending flight of the endless chain hoist, and the carriage is thereby elevated on the elevator to desired altitude for unloading where travel of the carriage is temporarily suspended and the carriage is supported as described. Then the loaded carrier is manually swung around the hinge bolt as an axis against the tension of the coiled spring 45, the extended end of which is anchored on the carriage, to the dotted line position of Figure 4 or all of the way around to the opposite side of the elevator for unloading a bale or other commodity, and after unloading the bale the empty carrier is returned by the retracting spring to the position shown in full lines in Figure 4. When reaching this position, the bevel end 48 of the carrier posts strikes and swings the supporting lug 35 to off center position thereby releasing the suspending hook 29, which permits the spring 36 to actuate the hook to the chain engaging position shown in Figures 12 and 14, whereby the carriage rides down with the chain. When the desired loading position is reached by the elevator the suspending hook is automatically released from the chain, and assumes an idling position and after again loading the elevator, the lifting hook is again manually engaged with the ascending flight of the chain as hereinbefore described.

Having thus fully described my invention, what I claim as new and desire to secure by Letters Patent is:

1. In a power operated loading and unloading appliance the combination with a main frame, an upright elevator, and an endless chain hoist mounted in the elevator, of a vertically reciprocable carriage slidable on the elevator, a carrier hinged on the carriage with a vertical axis, and a retracting spring for retaining the carrier in loading position, coacting means on the chain and carriage for raising the carriage, coacting means on the carriage and elevator for temporarily suspending the carriage in uplifted position, and means for releasing the suspending means to permit lowering of the carriage.

2. In an appliance as described, the combination with an upright elevator and an endless chain hoist mounted therein, a vertically reciprocable carriage mounted on the elevator, and a carrier supported on the carriage, of a lifting pawl pivoted on the carriage for engagement with the chain, a suspending hook pivoted on the carriage for lowering engagement with the chain, a stop on the elevator, and control means on the stop for coaction with said hook and pawl.

3. In an appliance as described, the combination with an upright elevator, a vertically reciprocable carriage mounted on the elevator, and means for operating the carriage, of a carrier having perforated hinge-ears, complementary hinge ears on the carriage, a hinge bolt passed through said ears, a tension spring coiled about the bolt, and said spring having extended ends for connection to the carrier.

4. In a portable elevator, the combination which comprises a pair of spaced parallel posts, cross members connecting the posts, a carriage slidably mounted on said posts, a vertically disposed hinged bolt mounted on said carriage and extended upwardly from the side of one of said posts a carrier pivotally mounted on the hinge bolt of said carriage for lateral swinging action about the carriage and whereby the carrier swings from a position parallel to a plane passing through the centers of the posts to a position perpendicular to the said plane, resilient means for actuating the carrier about the axis of the pivot thereof, and means elevating said carriage with the carrier thereon on the said posts.

5. In a portable elevator, the combination which comprises a pair of spaced parallel posts, cross members connecting the posts, a carriage slidably mounted on said posts, a vertically disposed hinged bolt mounted on said carriage and extended upwardly from the side of one of said posts a carrier pivotally mounted on the hinge bolt of said carriage for lateral swinging action about the carriage and whereby the carrier swings from a position parallel to a plane passing through the centers of the posts to a position perpendicular to the said plane, resilient means for actuating the carrier about the axis of the pivot thereof, means elevating said carriage with the carrier thereon on the said posts, and means adjustably mounted on the posts for limiting upward movement of the carriage.

6. In a portable elevator, the combination which comprises a pair of spaced parallel posts, cross members connecting the posts, a carriage slidably mounted on said posts, a vertically disposed hinged bolt mounted on said carriage and extended upwardly from the side of one of said posts a carrier pivotally mounted on the hinge bolt of said carriage for lateral swinging action about the carriage and whereby the carrier swings from a position parallel to a plane passing through the centers of the posts to a position perpendicular to the said plane, resilient means for actuating the carrier about the axis of the pivot thereof, means elevating said carriage with the carrier thereon on the said posts, a supporting structure for suspending the elevator from a truck body, and means pivotally mounting the said parallel posts in the said supporting structure.

7. In an elevator, the combination which comprises a pair of spaced parallel posts, means rigidly connecting the posts at points spaced from the ends thereof, sprockets journaled in the connecting means spaced from the ends of the posts, an endless chain trained over the said sprockets and positioned between the posts, a carriage slidably mounted on said posts, latching means for engaging the carriage with the said endless chain, a cross member adjustably mounted on the posts and spaced from the upper end thereof, means on the cross member for engaging the latch of the carriage to disengage the carriage from the chain as the carriage approaches the cross member, a carrier including an L-shaped frame having a vertically disposed section with a horizontally disposed platform extended outwardly from the lower end thereof pivotally mounted on the carriage and positioned for lateral swinging movement about the carriage, a spring positioned between the carriage and carrier for swinging the carrier about the carriage, a supporting structure for suspending the parallel posts from a truck body, and means pivotally mounting said parallel posts in the supporting structure.

JACOB V. BROSAMER.

REFERENCES CITED

The following references are of record in the file of this patent:

UNITED STATES PATENTS

| Number | Name | Date |
| --- | --- | --- |
| 782,642 | Bradford | Feb. 14, 1905 |
| 1,494,343 | Culbertson | May 20, 1924 |
| 1,610,789 | Jensen | Dec. 14, 1926 |
| 1,978,170 | Roesner | Oct. 23, 1934 |
| 1,978,226 | Rear | Oct. 23, 1934 |
| 2,241,275 | Shinn et al. | May 6, 1941 |
| 2,268,793 | Askeris | Jan. 6, 1942 |
| 2,271,624 | Cochran | Feb. 3, 1942 |
| 2,491,255 | Edwards | Dec. 13, 1949 |

FOREIGN PATENTS

| Number | Country | Date |
| --- | --- | --- |
| 615,281 | Great Britain | Jan. 4, 1949 |